(12) United States Patent
Mason et al.

(10) Patent No.: US 11,580,309 B1
(45) Date of Patent: Feb. 14, 2023

(54) PREDICTIVE TIME SERIES DATA OBJECT MACHINE LEARNING SYSTEM

(71) Applicant: STATES TITLE, LLC, San Francisco, CA (US)

(72) Inventors: Erica Kimball Mason, London (GB); Timothy Nathaniel Rubin, San Francisco, CA (US)

(73) Assignee: STATES TITLE, LLC, San Francisco, CA (US)

( * ) Notice: Subject to any disclaimer, the term of this patent is extended or adjusted under 35 U.S.C. 154(b) by 0 days.

(21) Appl. No.: 17/694,331

(22) Filed: Mar. 14, 2022

(51) Int. Cl.
| | | |
|---|---|---|
| G06F 40/10 | (2020.01) | |
| G06F 40/40 | (2020.01) | |
| G06N 20/20 | (2019.01) | |
| G06F 16/383 | (2019.01) | |
| G06F 40/284 | (2020.01) | |
| G06F 40/279 | (2020.01) | |
| G06F 40/205 | (2020.01) | |
| G06F 40/216 | (2020.01) | |
| G06F 16/33 | (2019.01) | |
| G06F 40/30 | (2020.01) | |
| G06F 40/242 | (2020.01) | |

(52) U.S. Cl.
CPC ............ G06F 40/40 (2020.01); G06F 16/383 (2019.01); G06F 40/284 (2020.01); G06N 20/20 (2019.01); *G06F 16/3347* (2019.01); *G06F 40/205* (2020.01); *G06F 40/216* (2020.01); *G06F 40/242* (2020.01); *G06F 40/279* (2020.01); *G06F 40/30* (2020.01)

(58) Field of Classification Search
None
See application file for complete search history.

(56) References Cited

U.S. PATENT DOCUMENTS

| | | | | |
|---|---|---|---|---|
| 8,682,823 | B2 * | 3/2014 | Heinze | G06F 40/30 |
| | | | | 382/253 |
| 9,239,986 | B2 * | 1/2016 | Lin | G06N 20/00 |
| 10,540,377 | B2 * | 1/2020 | Li | G06F 16/287 |
| 10,614,164 | B2 * | 4/2020 | DeLuca | H04L 67/30 |
| 10,878,505 | B1 * | 12/2020 | Blair | G06K 9/6267 |
| 10,896,292 | B1 * | 1/2021 | Norton | G06V 10/40 |
| 2006/0116995 | A1 * | 6/2006 | Bloedorn | G06F 16/2465 |
| 2008/0256329 | A1 * | 10/2008 | Heinze | G06F 9/30036 |
| | | | | 707/E17.08 |
| 2018/0248746 | A1 * | 8/2018 | Deluca | H04L 67/535 |
| 2018/0288086 | A1 * | 10/2018 | Amiri | G06N 3/082 |
| 2018/0307904 | A1 * | 10/2018 | Patil | G06K 9/628 |
| 2018/0308112 | A1 * | 10/2018 | Prentice | G06Q 10/0637 |
| 2019/0317952 | A1 * | 10/2019 | Li | G06F 16/2246 |

(Continued)

*Primary Examiner* — Richard Z Zhu
(74) *Attorney, Agent, or Firm* — Pillsbury Winthrop Shaw Pittman, LLP

(57) ABSTRACT

Provided is a method including obtaining a first data object including a first set of data entries, wherein each data entry of the first set of data entries includes text content associated with a time entry. The method includes generating a first data object score using the text content and the time entries included in the first set of data entries and using scoring parameters, determine that the first data object score satisfies a data object score condition; perform in response to the first data object score satisfying the data object score condition, a condition-specific action associated with the data object score condition.

19 Claims, 10 Drawing Sheets

(56) References Cited

U.S. PATENT DOCUMENTS

| | | | | |
|---|---|---|---|---|
| 2019/0318269 A1* | 10/2019 | Ezen Can | ............ | G06F 40/205 |
| 2019/0349321 A1* | 11/2019 | Cai | ...................... | G06F 40/237 |
| 2020/0185102 A1* | 6/2020 | Leventhal | ............. | G06N 20/00 |

* cited by examiner

PREDICTIVE TIME SERIES DATA OBJECT MACHINE LEARNING SYSTEM

BACKGROUND

1. Field

The present disclosure relates generally to data object management and machine learning, and more specifically to using machine learning algorithms on time series data objects to make predictions.

2. Description of the Related Art

Data objects that include textual content are often generated by services and applications in computer systems and computer networks for various reasons. For example, in an electronic mail service, various users may generate, send, and receive email communications. In other examples, hardware components or software components included in a computing device may generate error logs or system events, medical records may be generated for a patient, or a title plant may include a property index that lists a set of records that include, for example, documents, surveys, interests, encumbrances, or other entries affecting title to a parcel of real property. Each of these data objects may be associated with a date or a time or may include data entries that are associated with a date or a time. In some cases, each entry in the time series may summarize a related respective record that is more expansive.

SUMMARY

According to one innovative aspect of the subject matter described in this application, a non-transitory, machine-readable medium storing instructions that, when executed by one or more processors, effectuate operations that include obtaining, by a computer system, a first data object including a first set of data entries, wherein each data entry of the first set of data entries includes text content associated with a time entry. The operations also include generating, by the computer system, a first data object score using the text content and the time entries included in the first set of data entries and using scoring parameters. The operations also include determining, by the computer system, that the first data object score satisfies a data object score condition, and performing, by the computer system and in response to the first data object score satisfying the data object score condition, a condition-specific action associated with the data object score condition.

The non-transitory, machine-readable medium storing instructions that, when executed by one or more processors to effectuate operations may include one or more of the following optional features.

Generating the first data object score may include converting the text content of each data entry to text strings, selecting text strings for each data entry that satisfy a frequency condition, vectorizing the selected text strings for each data entry to generate a data entry vector representation for each data entry, determining a recency weight for each data entry based on the time entry and the data entry vector representation, and determining a data entry score for each data entry based on the recency weight, wherein the generating the first data object score is based on an aggregation of the data entry score for each data entry.

The data entry score may be determined from the recency weight and a vector-based weight.

Generating the first data object score may include aggregating any duplicate data entry vector representation by removing the data entry vector representation that is associated with the least data entry score.

The recency weight may be determined by applying an exponential decay function to a delta of the time entry and a time associated with the first data object. A constant of the exponential decay function may be determined by a machine learning algorithm.

Selecting text strings that satisfy the frequency condition may include at least one of omitting the text strings that satisfy a high frequency condition, omitting the text strings that satisfy a low frequency condition, and omitting the text strings that are on a stop word dictionary.

The condition-specific action associated with the data object score condition may include storing the first data object in a database. The condition-specific action associated with the data object score condition may include generating a non-risk notification. The condition-specific action associated with the data object score condition may include generating a risk notification. The condition-specific action associated with the data object score condition may include generating an error notification. The condition-specific action associated with the data object score condition may include generating a non-error notification.

Alternatively, the condition-specific action associated with the data object score condition may include inputting the data object score into an ensemble-based machine learning model, wherein the operations may further include operating, by the computer system, the ensemble-based machine learning model with the data object score; and outputting, by the computer system, a risk score.

The first data object may include a title plant and each data entry of the first set of data entries may include a document label for a title document. Additionally, or alternatively, the first data object may include an error log for a hardware component or a software component included in a computing device and each data entry of the first set of data entries may include an error label for an error instance.

As an additional feature, the operations may further include obtaining, by the computer system, a second data object including a second set of data entries, wherein each data entry of the second set of data entries may include text content associated with a time entry; and generating, by the computer system, a second data object score using the text content and the time entries included in the second set of data entries and using scoring parameters, wherein the first data object score includes the second data object score when determining the first object score satisfies the data object score condition.

Generating the first data object score may include converting the text content of each data entry of the first data object to text strings; converting the text content of each data entry of the second data object to text strings; selecting text strings for each data entry of the first data object and the second data object that satisfy a frequency condition; vectorizing the selected text strings for each data entry to generate a data entry vector representation for each data entry of the first data object and the second data object; determining a recency weight for each data entry based on the time entry and the data entry vector representation; and determining a data entry score for each data entry of the first data object and the second data object based on the recency weight, wherein the generating the first data object score may be based on an aggregation of the data entry score for each data entry of the first data object and the second data object.

The data entry score may be determined from the recency weight, a vector-based weight, and a data object weight.

The operations may further include steps for determining the scoring parameters.

According to another innovative aspect of the subject matter described in this application, a method includes obtaining, by a computer system, a first data object including a first set of data entries, wherein each data entry of the first set of data entries includes text content associated with a time entry. The method includes generating, by the computer system, a first data object score using the text content and the time entries included in the first set of data entries and using scoring parameters, determining, by the computer system, that the first data object score satisfies a data object score condition; and performing, by the computer system and in response to the first data object score satisfying the data object score condition, a condition-specific action associated with the data object score condition.

According to another innovative aspect of the subject matter described in this application, a system, includes one or more processors, and memory storing instructions that when executed by the processors cause the processors to effectuate operations. The operations include obtaining a first data object including a first set of data entries, where each data entry of the first set of data entries includes text content associated with a time entry. The operations include generating, using an ensemble-based machine learning model, a first data object score using the text content and the time entries included in the first set of data entries and using scoring parameters, determining that the data object score satisfies a data object score condition; and performing a condition-specific action associated with the data object score condition.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The above-mentioned aspects and other aspects of the present techniques will be better understood when the present application is read in view of the following drawings in which like numbers indicate similar or identical elements.

Figure 1:
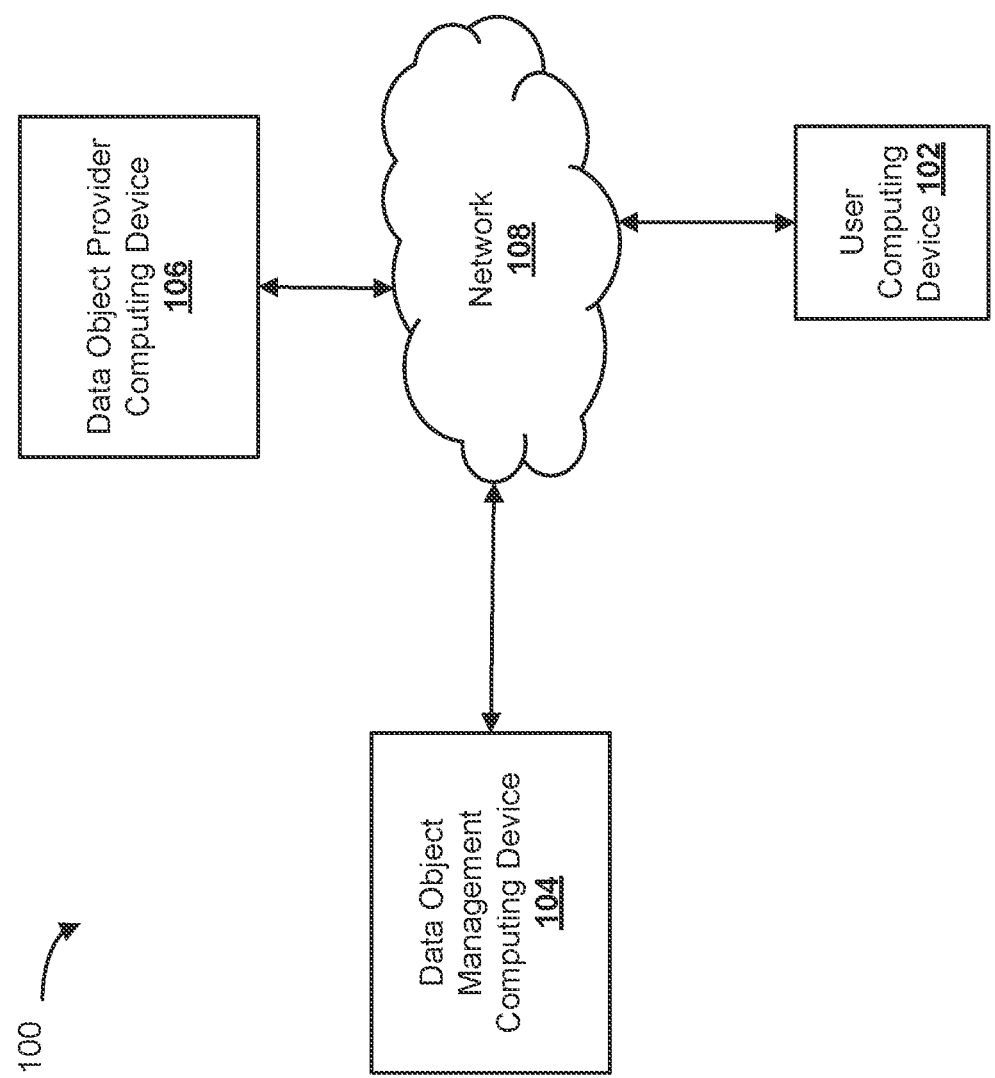
FIG. 1 is a block diagram illustrating an example of a data object prediction system, in accordance with some embodiments of the present disclosure.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of machine learning, natural language processing, data object management, and computer science. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

This specification describes techniques for training, optimizing, and applying a machine learning model. The machine learning model may be trained to predict whether a parameter is likely to occur as well as a magnitude of the parameter. The machine learning model may be trained using a collection of data with known values for the prediction parameter. The output of the machine learning model may be compared with one or more thresholds to determine an action responsive to the prediction.

For example, the machine learning model may be used to evaluate a parameter associated with a software or hardware component on a computing device based on a model trained from data obtained for a collection of other software or hardware components. The parameter being predicted may include a predication of whether a software or hardware component is likely to fail. In another example, the machine learning model may be used to evaluate a parameter associated with a parcel of real property based on a model trained from data obtained for a collection of other parcels of real property. The parameter being predicted may include a prediction of whether a property is subject to an involuntary lien or other title defect. In another example, the machine learning model may be used to evaluate a parameter associated with a patient based on a model trained from data obtained for a collection of other patient data. The parameter being predicted may include a predication of whether a patient is likely to have a disease. In yet another example, the machine learning model may be used to evaluate a parameter associated with an electronic mail user based on a model trained from data obtained for a collection of other electronic mail users. The parameter being predicted may include a predication of a psychographic segment to which the electronic mail user belongs.

Particularly, in a real estate transaction involving a parcel of real property, an important step is performing a title search and obtaining title insurance to protect a lender's mortgage on the real property or the owner's interest in the property. Any identified defects, for example, an existing mortgage on the parcel, a mechanics lien, or other liens typically need to be resolved before a title company will issue title insurance for the parcel. If an unidentified defect is later discovered, the title insurance insures against any losses resulting from the defect. Consequently, title insurance is often required in real estate transactions and particularly for those financed by third parties.

Title insurance companies may receive thousands of requests for title insurance which requires manual checks by underwriters. Existing data sources for lien information may be error prone. For example, an older mortgage may not be identified as closed even though it is no longer attached to the property. As a result, human reviewers are often required to examine the set of open liens to determine whether the liens are actually open or have been previously paid off. A machine learning model may be used to determine the likelihood that an identified lien is still open regardless of the status indicated in the data records for the parcel. Those that satisfy a specified threshold likelihood may be then evaluated by human reviewers.

Finally, the error prone nature of existing lien data may cause traditional title insurance providers to entirely miss a lien that is outstanding, because the lien data may simply not exist in the public record due to a human error. A machine learning model may be used to flag such a lien when another lien has been subordinated to it during a prior transaction. This model may reduce the risk of negative consumer or lender impact when such a lien is missed during the traditional process.

Furthermore, some machine learning models may consider all text content from the entire document body when deciding a parameter. Often data objects (a term which should not be read to suggest that the present techniques are limited to object-oriented programming languages, as other types of data structures may also serve as objects in the present sense) may include a plurality of entries in the time series that may summarize a related respective record that is more expansive. However, for performance reasons, it may be desirable to produce output based on the entries rather than processing the more expansive records to which they correspond. Furthermore, the more expansive record may be a scanned copy of a hand-written or typed document, of a different format than other records, or may include other unique characteristics that may make it difficult to obtain any data or consistent data from the more expansive record.

The systems and methods of the present disclosure include a computer system that obtains a data object that includes a set of data entries. Each data entry of the set of data entries includes text content associated with a time entry. The computer system generates a data object score for the data object using data entry scores and scoring parameters. The data entry scores may be determined by vectorizing the text content of each entry. A recency weight may be used to calculate the time entry score based on the data entry vector representation or the vector weight. A machine learning algorithm may be used to determine a vector weight for each data entry vector representation with respect to how the identified vector may impact a parameter that is being predicted. The recency weight may also be determined based on a machine learning algorithm that determines the importance time has on the particular data entry vector representation or the parameter that is being predicted. Using a machine learning model, the data entry scores may result in the data object score. That data object score may be used to determine that a data object score condition is satisfied. The data object score condition may be determined based on machine learning. The computer system may then perform a condition-specific action associated with the data object score condition.

FIG. 1 depicts a block diagram of an example of a data object prediction system 100, consistent with some embodiments. In some embodiments, the data object prediction system 100 may include a user computing device 102, a data object management computing device 104, and a data object provider computing device 106. The user computing device 102 and the data object management computing device 104 may be in communication with each other over a network 108. In various embodiments, the user computing device 102 may be associated with a user (e.g., in memory of the data object prediction system 100 in virtue of user profiles). These various components may be implemented with computing devices like that shown in FIG. 10.

In some embodiments, the user computing device 102 may be implemented using various combinations of hardware or software configured for wired or wireless communication over the network 108. For example, the user computing device 102 may be implemented as a wireless telephone (e.g., smart phone), a tablet, a personal digital assistant (PDA), a notebook computer, a personal computer, a connected set-top box (STB) such as provided by cable or satellite content providers, or a video game system console, a head-mounted display (HMD), a watch, an eyeglass projection screen, an autonomous/semi-autonomous device, a vehicle, a user badge, or other user computing devices. In some embodiments, the user computing device 102 may include various combinations of hardware or software having one or more processors and capable of reading instructions stored on a tangible non-transitory machine-readable medium for execution by the one or more processors. Consistent with some embodiments, the user computing device 102 includes a machine-readable medium, such as a memory that includes instructions for execution by one or more processors for causing the user computing device 102 to perform specific tasks. In some embodiments, the instructions may be executed by the one or more processors in response to interaction by the user. One user computing device is shown, but commercial implementations are expected to include more than one million, e.g., more than 10 million, geographically distributed over North America or the world.

The user computing device 102 may include a communication system having one or more transceivers to communicate with other user computing devices or the data object management computing device 104. Accordingly, and as disclosed in further detail below, the user computing device 102 may be in communication with systems directly or indirectly. As used herein, the phrase "in communication," and variants thereof, is not limited to direct communication or continuous communication and may include indirect communication through one or more intermediary components or selective communication at periodic or aperiodic intervals, as well as one-time events.

For example, the user computing device 102 in the data object prediction system 100 of FIG. 1 may include first (e.g., relatively long-range) transceiver to permit the user computing device 102 to communicate with the network 108 via a communication channel. In various embodiments, the network 108 may be implemented as a single network or a combination of multiple networks. For example, in various embodiments, the network 108 may include the Internet or one or more intranets, landline networks, wireless networks, or other appropriate types of communication networks. In another example, the network 108 may comprise a wireless telecommunications network adapted to communicate with other communication networks, such as the Internet. The wireless telecommunications network may be implemented by an example mobile cellular network, such as a long-term evolution (LTE) network or other third generation (3G), fourth generation (4G) wireless network, fifth generation (5G) wireless network or any subsequent generations. In some examples, the network 108 may be additionally or alternatively be implemented by a variety of communication networks, such as, but not limited to (which is not to suggest that other lists are limiting), a satellite communication network, a microwave radio network, or other communication networks.

The user computing device 102 additionally may include second (e.g., short-range relative to the range of the first transceiver) transceiver to permit the user computing device 102 to communicate with each other or other user computing devices via a direct communication channel. Such second transceivers may be implemented by a type of transceiver supporting short-range (i.e., operate at distances that are shorter than the long-range transceivers) wireless networking. For example, such second transceivers may be implemented by Wi-Fi transceivers (e.g., via a Wi-Fi Direct protocol), Bluetooth® transceivers, infrared (IR) transceivers, and other transceivers that are configured to allow the user computing device 102 to communicate with each other or other user computing devices via an ad-hoc or other wireless network.

The data object prediction system 100 may also include or may be in connection with the data object management computing device 104. For example, the data object management computing device 104 may include one or more server devices, storage systems, cloud computing systems, or other computing devices (e.g., desktop computing device, laptop/notebook computing device, tablet computing device, mobile phone, etc.). In various embodiments, data object management computing device 104 may also include various combinations of hardware or software having one or more processors and capable of reading instructions stored on a tangible non-transitory machine-readable medium for execution by the one or more processors. Consistent with some embodiments, the data object management computing device 104 includes a machine-readable medium, such as a memory (not shown) that includes instructions for execution by one or more processors (not shown) for causing the data object management computing device 104 to perform specific tasks. In some embodiments, the instructions may be executed by the one or more processors in response to interaction by the user. The data object management computing device 104 may also be maintained by an entity with which sensitive credentials and information may be exchanged with the user computing device 102. The data object management computing device 104 may further be one or more servers that hosts applications for the user computing device 102. The data object management computing device 104 may be more generally a web site, an online content manager, a service provider, a healthcare records provider, an electronic mail provider, a title insurance service provider, a datacenter management system, or other entity that generates or uses data objects that include textual content.

The data object management computing device 104 may include various applications and may also be in communication with one or more external databases, that may provide additional information or data objects that may be used by the data object management computing device 104. For example, the data object management computing device 104 may obtain, via the network 108, data objects from a data object provider computing device 106 that may obtain or generate data objects that include textual content for the data object management computing device 104. While a specific data object prediction system 100 is illustrated in FIG. 1, one of skill in the art in possession of the present disclosure will recognize that other components and configurations are possible, and thus will fall under the scope of the present disclosure.

Figure 2:
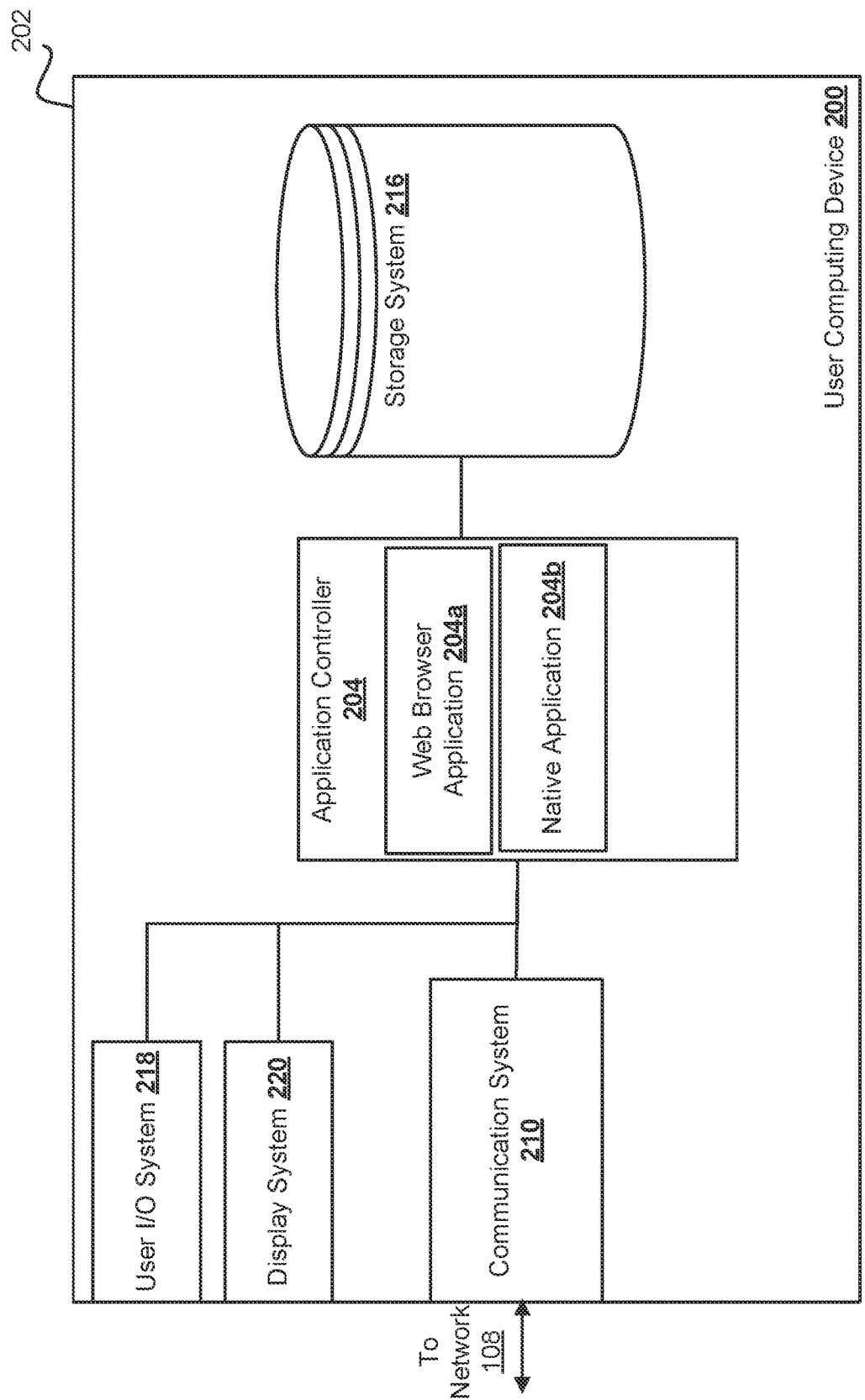
FIG. 2 is a block diagram illustrating an example of a user computing device of the data object prediction system of FIG. 1, in accordance with some embodiments of the present disclosure.

FIG. 2 illustrates an embodiment of a user computing device 200 that may be the user computing device 102 discussed above with reference to FIG. 1. In the illustrated embodiment, the user computing device 200 includes a chassis 202 that houses the components of the user computing device 200. Several of these components are illustrated in FIG. 2. For example, the chassis 202 may house a processing system and a non-transitory memory system that includes instructions that, when executed by the processing system, cause the processing system to provide an application controller 204 that is configured to perform the functions of the application controller or the user computing devices, discussed below. In the specific example illustrated in FIG. 2, the application controller 204 is configured to provide one or more of a web browser application 204a or a native application 204b.

The chassis 202 may further house a communication system 210 that is coupled to the application controller 204 (e.g., via a coupling between the communication system 210 and the processing system). The communication system 210 may include software or instructions that are stored on a computer-readable medium and that allow the user computing device 200 to send and receive information through the communication networks discussed above. For example, the communication system 210 may include a communication interface to provide for communications through the network 108 as detailed above (e.g., first (e.g., long-range) transceiver). In an embodiment, the communication interface may include a wireless antenna that is configured to provide communications with IEEE 802.11 protocols (Wi-Fi), cellular communications, satellite communications, other microwave radio communications or communications. The communication system 210 may also include a communication interface (e.g., the second (e.g., short-range) transceiver) that is configured to provide direct communication with other user computing devices, sensors, storage devices, beacons, and other devices included in the securitization system discussed above with respect to FIG. 1. For example, the communication interface may include a wireless antenna that configured to operate according to wireless protocols such as Bluetooth®, Bluetooth® Low Energy (BLE), near field communication (NFC), infrared data association (IrDA), ANT®, Zigbee®, Z-Wave® IEEE 802.11 protocols (Wi-Fi), or other wireless communication protocols that allow for direct communication between devices.

The chassis 202 may house a storage device (not illustrated) that provides a storage system 216 that is coupled to the application controller 204 through the processing system. The storage system 216 may be configured to store data, applications, or instructions described in further detail below and used to perform the functions described herein. In various embodiments, the chassis 202 also houses a user input/output (I/O) system 218 that is coupled to the application controller 204 (e.g., via a coupling between the processing system and the user I/O system 218). In an embodiment, the user I/O system 218 may be provided by a keyboard input subsystem, a mouse input subsystem, a track pad input subsystem, a touch input display subsystem, a microphone, an audio system, a haptic feedback system, or any other input subsystem. The chassis 202 also houses a display system 220 that is coupled to the application controller 204 (e.g., via a coupling between the processing system and the display system 220) and may be included in the user I/O system 218. In some embodiments, the display system 220 may be provided by a display device that is integrated into the user computing device 200 and that includes a display screen (e.g., a display screen on a laptop/notebook computing device, a tablet computing device, a mobile phone, or wearable device), or by a display device that is coupled directly to the user computing device 200 (e.g., a display device coupled to a desktop computing device by a cabled or wireless connection).

Figure 3:
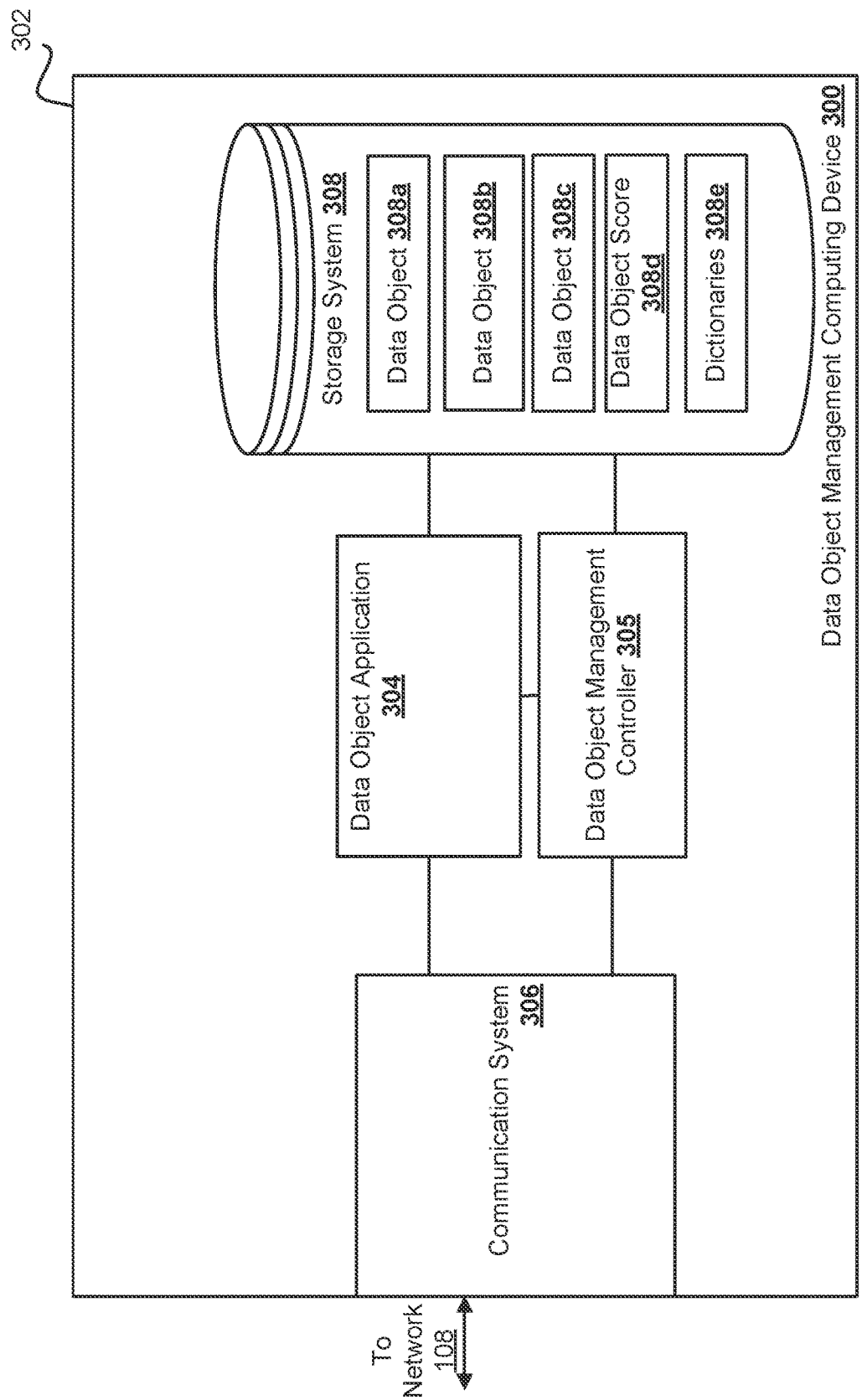
FIG. 3 is a block diagram illustrating an example of a data object management computing device of the data object predication system of FIG. 1, in accordance with some embodiments of the present disclosure.

FIG. 3 depicts an embodiment of a data object management computing device 300, which may be the data object management computing device 104 discussed above with reference to FIG. 1. In the illustrated embodiment, the data object management computing device 300 includes a chassis 302 that houses the components of the data object management computing device 300, only some of which are illustrated in FIG. 3. For example, the chassis 302 may house a processing system (not illustrated) and a non-transitory memory system (not illustrated) that includes instructions that, when executed by the processing system, cause the processing system to provide a data object application 304 that is configured to perform the functions of the data object application or data object management computing device discussed below. Specifically, the data object application may generate data objects that include data entries that have text content and are associated with a time entry as discussed in further detail below. The data object application may be configured to provide data objects that include time series data entries over the network 108 to the web browser application 204a or the native application 204b included on the user computing device 102/200. For example, the user of the user computing device 102/200 may interact with the data object application 304 through the application controller 204 over the network 108 to request information, conduct a commercial transaction, send or receive email communications, store or retrieve data objects, obtain an error report, obtain medical records, receive a prediction of a parameter for which a machine learning algorithm is predicting, or otherwise interact with the data object application 304.

The processing system and the non-transitory memory system may also include instructions that, when executed by the processing system, cause the processing system to provide a data object management controller 305 that is configured to perform the functions of the data object management controller or data object management computing device discussed below. For example, the data object management controller 305 may use data objects that include time series data entries to make predictions using various machine learning algorithms and artificial intelligence, as discussed in further detail below.

The chassis 302 may further house a communication system 306 that is coupled to the data object management controller 305 (e.g., via a coupling between the communication system 306 and the processing system) and that is configured to provide for communication through the network 108 of FIG. 1 as detailed below. The communication system 306 may allow the data object management computing device 300 to send and receive information over the network 108 of FIG. 1. The chassis 302 may also house a storage device (not illustrated) that provides a storage system 308 that is coupled to the data object management controller 305 through the processing system. The storage system 308 may be configured to store a data object 308a, a data object 308b, or up to a data object 308c, a data object score 308d, dictionaries 308e or other data or instructions to complete the functionality discussed herein. In various embodiments, the storage system 308 may be provided on the data object management computing device 300 or on a database accessible via the communication system 306. Furthermore, while the data object application 304 is illustrated as being located on the data object management computing device 104/300, the data object application may be included on the data object provider computing device 106 of FIG. 1. For example, the data object application 304 may obtain a data object or a portion of the data object from the data object provider computing device 106 rather than generate the data object completely itself.

Figure 4:
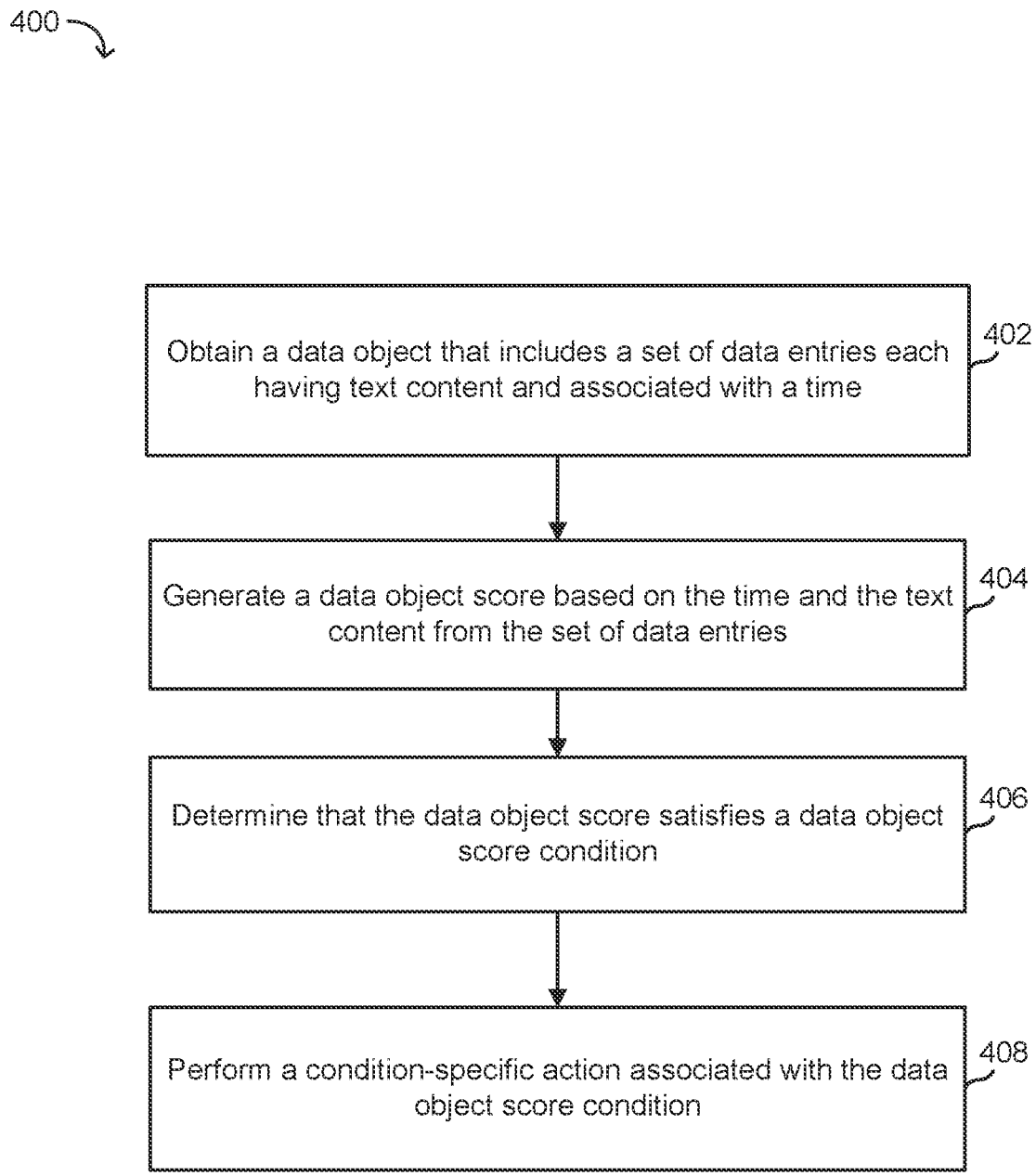
FIG. 4 is a flow diagram illustrating an example of a method of the data object prediction system, in accordance with some embodiments of the present disclosure.

FIG. 4 depicts an embodiment of a method 400 of data object prediction, which in some embodiments may be implemented with the components of FIGS. 1, 2, and 3 discussed above. As discussed below, some embodiments make technological improvements to data object analysis and machine learning predictions using data objects that include time series data entries that include text content. In a variety of scenarios, the systems and methods of the present disclosure may be useful to draw inferences from a time series of unstructured or partially un-structured entries, like natural language entries in an index of historical records. Examples include inferring root causes from error logs in distributed systems, scoring heart attack risk of patients based on summaries (like titles) of electronic medical records, classifying users into psychographic segments based on the subject lines of their emails, or inferring unreleased involuntary liens on real property based on a property index or a general index from a title plant. In some cases, each such data entry in time series may summarize a related respective record that is more expansive, but for performance reasons, it may be desirable to produce an output based on the entries rather than processing the more expansive records to which they correspond. One of skill in the art in possession of the present disclosure will recognize that these Internet-centric and data object-based problems, along with other Internet-centric and data object-based problems, are solved or mitigated by some of these embodiments. Again, though, embodiments are not limited to approaches that address these problems, as various other problems may be addressed by other aspects of the present disclosure, which is not to suggest that any other description is limiting.

The method 400 is described as being performed by the data object management controller 305 included on the data object management computing device 104/300. Furthermore, it is contemplated that the user computing device 102/200 or the data object provider computing device 106 may include some or all the functionality of the data object management controller 305. As such, some or all of the steps of the method 400 may be performed by the user computing device 102/200 or the data object provider computing device 106 and still fall under the scope of the present disclosure. As mentioned above, the data object management computing device 104/300 may include one or more processors or one or more servers, and thus the method 400 may be distributed across the those one or more processors or the one or more servers.

The method 400 may begin at block 402 where a data object including a set of data entries is obtained. In an embodiment, at block 402, the data object management controller 305 may obtain a data object that includes a set of data entries. Each data entry of the set of data entries may include text content associated with a respective time entry. As such, the data object may be considered to include a time series of unstructured or partially un-structured entries, like natural language entries in an index of historical records. In some cases, each such entry in the time series may summarize a related respective record that is more expansive.

In various embodiments, the data object management controller 305 may obtain the data object from the data object application 304. As discussed above, the data object application 304 may include a server-based application that the user computing device 102, acting as a client in a client-server relationship, may interact with via the web browser application 204a or the native application 204b. During the interactions and operations of the data object application 304, the data objects (e.g., data objects 308a-308c) may be generated and may be stored in the storage system 308 or obtained by the data object management controller 305 from the data object application 304 or the storage system 308. In other examples, the data object management controller 305 may obtain the data objects from the data object provider computing device 106 and may make decisions for operations occurring on the data object application 304. Specifically, the data object management controller 305 may interact with the data object provider computing device 106 via a single application programming interface (API) that allows the data object management controller 305 to interact with one or more applications on the data object provider computing device 106 that may provide one or more data objects to the data object management controller 305. However, multiple APIs may be used and included at the data object management controller 305 to interact with the applications provided by the data object provider computing device 106 or the data object application 304.

In various examples, the data object application 304 or the data object provider computing device 106 may include an electronic mail application that may generate electronic mail and the subject of each electronic mail be incorporated into a data object that may be viewed by a user along with a time at which the email was received or sent. In another example, the data object application 304 or the data object provider computing device 106 may include an underwriting application that assesses the risk of liens on a property by using a data object that may include the response from a title plant API that lists all documents recorded against a property or person within a certain jurisdiction and a date at which those documents were recorded. In yet another example, the data object application 304 may include a system management application used to infer root causes from error logs in distributed systems or computing system components. The data object may include an error log and each entry of the error log may be a specific error or error summary associated with a time at which the error entry was generated. The data object provider computing device 106 may provide its error log to the data object application 304 and the data object management controller 305 for analysis. In another example, the data object application 304 or the data object provider computing device 106 may include a medical record management application or health risk assessment application used for, but not limited to, scoring heart attack risk of patients based on summaries (like titles of) electronic medical records.

In various embodiments, additional data objects besides the data object may be obtained. For example, a plurality of electronic mail indexes may be obtained. In another example, a plurality of medical records for a patient from different healthcare providers may be obtained. In yet another example, multiple error logs may be obtained from different systems or components within a system. In yet another example, a title plant may include a property search and a general index (owner name) search. Those additional data objects may include time series data entries as well.

The method 400 may then proceed to block 404 where a first data object score is generated using the text content and the time entries included in the first set of data entries and using scoring parameters. In an embodiment, at block 404, the data object management controller 305 may generate a first data object score. The data object management controller 305 may generate a data entry score for each data entry and aggregate the data entry scores to generate the data object score. The data entry score for a data entry included in the data object may be based on the text content included in the data entry and the time entry included in the data entry.

Figure 5:
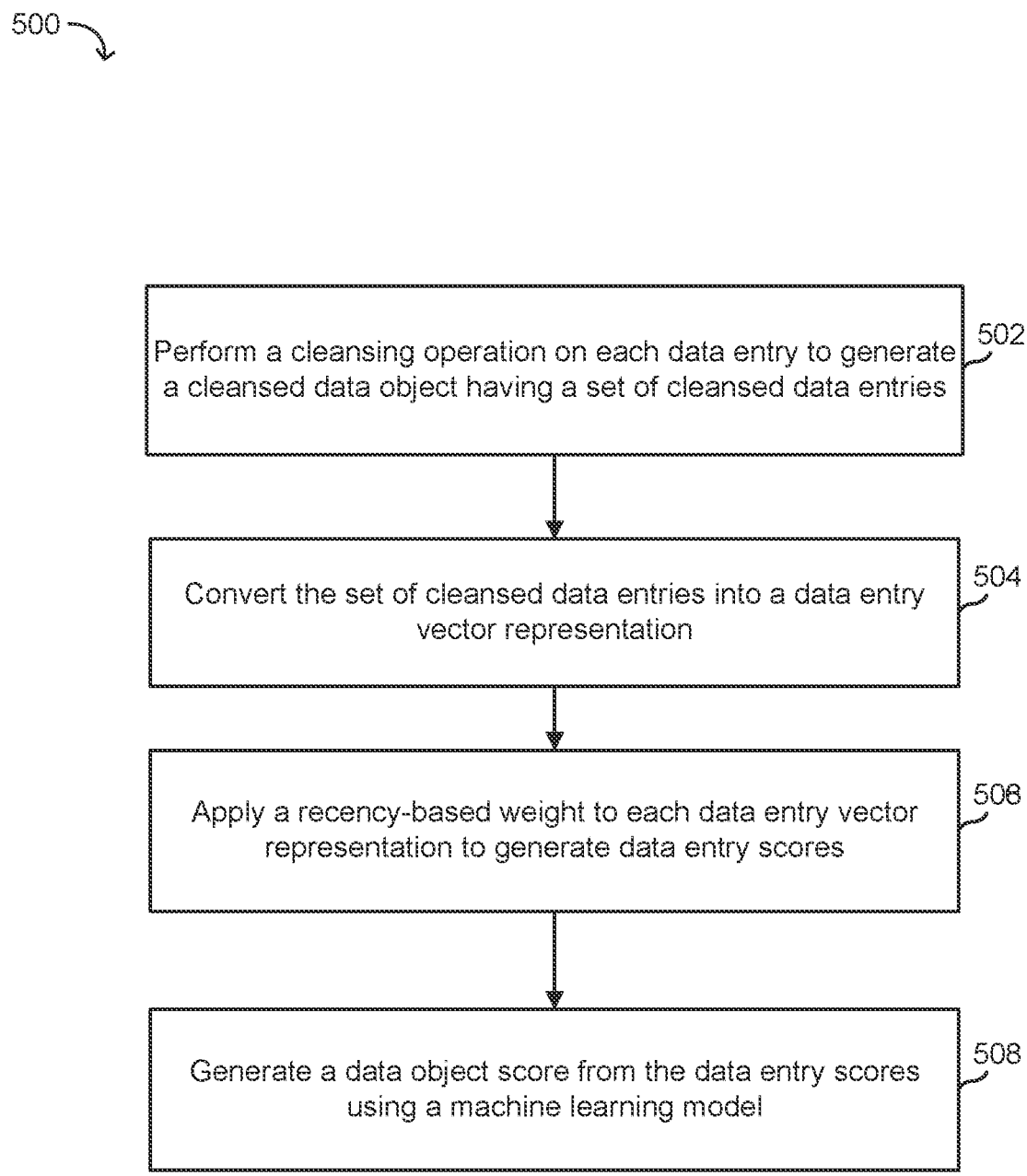
FIG. 5 is a flow diagram illustrating an example of a sub-method of determining a data object score for the method of the data object prediction system, in accordance with some embodiments of the present disclosure.

FIG. 5 illustrates a sub-method 500 of block 404 of generating a data object score from data entry scores using machine learning techniques further described herein. In a specific example, a data entry score for the data entries in the data object may be generated by performing data entry-type recency vectorization algorithm. The data entry-type recency vectorization algorithm may begin at block 502 where a cleansing operation on each data entry is performed. In an embodiment, at block 502, the data object management controller 305 may perform a cleansing operation on the data object and its data entries. For example, the data object management controller 305 may operate to remove any stop words (e.g., the, a, of, or other filler words) from the text content included in each data entry. The data object management controller 305 may reference a stop word dictionary included in the dictionaries 308e that includes a list of stop words for which the data object management controller 305 uses to search and identify the stop words in the set of data entries. The data object management controller 305 may remove the stop words from the data entries that are found in the stop word dictionary.

In other examples, stop words may be determined based on words that satisfy a high frequency condition or words that satisfy a low frequency condition. For example, the data object management controller 305 may include an inverse document frequency (IDF) algorithm to find least frequently and most frequently used words in a corpus of data objects. In other embodiments, other data cleansing operations may be used to correct or remove errors in the text content, remove duplicate text content, remove inconsistent text content, and/or perform any other text content cleansing operations that would be apparent to one of skill in the art in possession of the present disclosure. Such additional content cleansing operations may include converting code text to full strings of text. In various embodiments, a data object type-identifier is added to each cleansed data entry include the cleansed data object to identify the type of data object (e.g., a general name index identifier or a property search identifier for data objects included in a title plant). Subsequent to the cleansing operation, a cleansed data object that includes a set of cleansed data entries is generated.

The method 500 may then proceed to block 504 where the set of cleansed data entries are converted into a data entry vector representation. In one example, the data object management controller 305 may include a natural language processing vocabulary to identify text strings in the text content of cleansed set of data entries. In other examples, the data object management controller 305 may use a finite dictionary built from a plurality of data objects associated with the data object application 304. For example, the data entry-type recency vectorization algorithm provided by the data object management controller 305 may convert the cleansed data entries into a data entry vector representation using a finite dictionary included in the dictionaries 308e. The finite dictionary may include natural language tokens that may be provided by a system administrator. However, in other embodiments, the finite dictionary may be built by searching a corpus of data objects (e.g., the data objects 308a-308c) for common terms and/or terms that may be important to the entity. For example, the data object management controller 305 may perform one or more decluttering techniques to reduce the corpus size of the text strings in the dictionary such as, for example, regex for targeted pruning, stemming, lemmatization, Parts-Of-Speech (POS) tags, name entities, noun phrases, noun chunks, and/or any other decluttering techniques that will reduce the corpus size of the text strings.

The data object management controller 305 may further operate to apply a substring tokenization algorithm to the corpus of data objects. For example, a vectorization algorithm may include SentencePiece which may support Byte-Pair Encoding (BPE) or Unigram language model that may be used by the data object management controller 305 to capture text strings that appear frequently enough to determine the importance of the text string but also diverse enough between the sub strings to minimize recapturing the same information and to build up a useful, diverse sub-word dictionary that is a fixed size according to a predetermined dictionary size.

Subsequent to the dictionary being established, the data object management controller 305 may convert the cleansed data object to a data object vector representation using the dictionary included in the dictionaries 308e. The data object management controller 305 may apply the vectorization algorithm to the set of data entries to obtain a data entry vector representation for each data entry. For example, SentencePiece may be used to vectorize the sub strings in each data entry of the data object. Those vector representations of the substrings may be averaged to obtain vectors for the individual text strings of the data entry or the vector of the data entry itself. In some embodiments, a running window technique may be used to obtain a vector for the data entry by including one or more lines above the data entry and/or one or more lines below the data entry and averaging the vectors of those lines to obtain a vector for the data entry.

While SentencePiece is described as vectorizing the data objects and using a language agnostic dictionary generator (e.g., BPE or Unigram), one of skill in the art in possession of the present disclosure will recognize that other tokenization/vectorization algorithms may be used obtain a data entry vectorization representation of the data entries. For example, the vectorization algorithm may include a Doc2Vec algorithm, a Sentence2Vec algorithm, a Word2Vec algorithm, a FastText algorithm, and/or any other tokenization/vectorization algorithm that would be apparent to one of skill in the art in possession of the present disclosure that may be used to generate a data entry vector representation of the data entries by first converting a portion of the text content (e.g., words, sentences) to vectors using the dictionary and averaging or aggregating those vectors representations to obtain a data entry vector representation for that data entry in the set of data entries.

In a specific example, a text embedding vector algorithm included in the data object management controller 305 may generate a text embedded matrix using the text content in each of the data entries. For example, the text embedding vector algorithm may embed each word in the text object dictionary as a fixed length vector where words with high semantic similarity may be embedded to similar vectors (e.g., with high cosine similarity). The text embedded matrix may include a size of M×d where "M" is the number of unique words across the data objects and "d" is the dimension of the fixed length vector. Too large of value of d may provide sparse feature space. That space may lead to overfitting, improper training of a Gaussian Mixture model, and difficulty in mapping semantic similar words in the same space. Too small value of d indicates a low number of dimensions without the ability to grasp the semantic differences between different words. In various embodiments, the text embedding vector algorithm may include a Word2Vec algorithm or any other text embedding algorithm that would be apparent to one of skill in the art in possession of the present disclosure. While a text embedding vector algorithm is described, an n-gram vector algorithm may be contemplated where the n-gram vector algorithm includes a dictionary of n-grams that may provide an entire data entry because of common document titles across data objects.

In various embodiments, when vectorizing data entries of data objects, data sources from which the different data object come may be tracked. This may allow the machine learning model, discussed below, to learn which type of data object the model can trust more for different types of data objects and the sources of those data objects.

The method 500 may then proceed to block 506 where a recency weight is applied to each data entry vector representation. In one implementation, at block 506, the data object management controller 305 may determine the time that is associated with each data entry of the set of data entries. Based on the time associated with the data entry, a recency weight may be applied to the data entry vector representation. For example, for each data entry, a delta in the time of the data object or current date and the time associated with the data object may be determined. That delta may be applied to an exponential decay to transform the recency to a value between "0" and "1" where "1" indicates more recent and "0" indicates less recent. A constant from this transformation may be chosen through the machine learning optimization technique described according to features of the present implementation. For example, the equation:

$$\text{recency weight} = e^{\char`\^}(\text{time delta}/c)$$

may be used. However, in other implementations, block 506 may depend on the data entry vector representation. For example, the recency weight may depend on the text content or the data entry vector representation and the recency between the data object and the data entry. For example, a mortgage lien may have a different weight function for the recency weight than a weight function of a homeowner's association lien. After the recency weight is applied to each data entry vector representation, a data entry score is generated for that data entry. As such, a different data entry score may be calculated for a mortgage lien than a homeowner's association lien even if those liens occur on the same day. In some examples, a first data entry associated with a first data entry vector representation may receive a lesser data entry score when associated with more current dates, while a second data entry associated with a second data entry vector representation may receive a greater data entry score when associated with more current dates. In various implementations, duplicate data entries that include the same or satisfy a similarity condition (e.g., within 1%, 2%, 5%, 10% of data entry vector representation of each other) may be combined or the data entry that has the lowest data entry score may be ignored.

The method 500 may proceed to block 508 where a data object score is generated. In an embodiment, at block 508, the data object management controller 305 may generate a data object score. The data object score may be an aggregation of the data entry scores associated with the set of data entries. However, in various embodiments, the data object score may be generated by a machine learning model provided by the data object management controller 305. The machine learning model (e.g., a gradient boosting machine (GBM) model, a tree-based model, or other machine learning models) may include a mechanism for scoring the data entry scores from block 506, using parameters/weights learned during model training. The machine learning model instantiates a way to convert an n input vector (recency weighted data entry vectors also referred to as data entry scores) into a single predictive score, and the particular instantiation is based on which model is chosen, and what the model learns during training on a training dataset of data objects that are based on factors such as, for example, recency, a data object type, a data object source, and data entry vectors.

Figure 6:
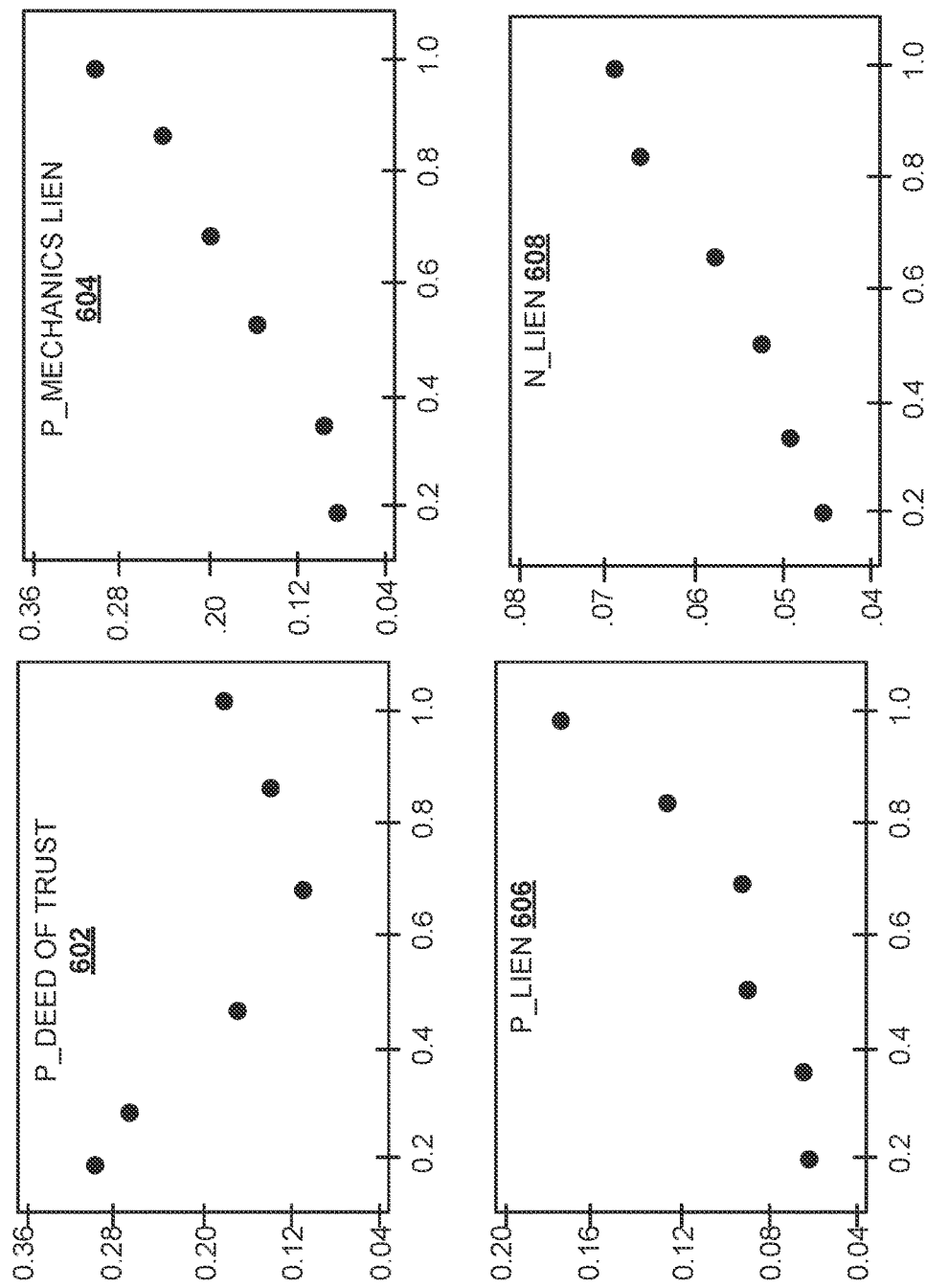
FIG. 6 is a set of graphs that illustrate a relationship between the recency of a data entry, the data entry type, and the data object type and the output risk score for a parcel of property that can be observed during the method of FIG. 4, in accordance with some embodiments of the present disclosure.

FIG. 6 illustrates several dependency plots illustrating how the machine learning model weights different data entry vector representations based on recency for the title plant scenario discussed above. The machine learning algorithms discussed above may determine for each data entry vector representation a data object score that is based on the time associated with the data entry, a data object type, and the specific data entry within the data object. As can be seen from the plots 602, 604, 606, and 608, each data entry vector representation may be associated with a different function of the data object score versus time. The x-axis on these graphs represents time where 0.1=31 years old, 0.2=22 years old, 0.3=16 years old, 0.4=12 years old, 0.5=9 years old, 0.6=7 years old, 0.7=5 years old, 0.8=3 years old, 0.9=1.5 years old, and 1 is for situations where there is no date associated with the data entry. The y-axis may represent the final data object score. As such, the plots show how for each data entry vector representation, which may be based on a data object type and a data entry on that data object type how the data object score changes when recency is changed. As can be seen from the graphs, a "P_DEED OF TRUST" data entry (a deed of trust data entry in the property index data object) (e.g., plot 602) may cause a greater data object score for older dates while a "P_MECHANICS LIEN" (a mechanics lien in the property search index data object) (e.g., plot 604) may cause a greater data object score for more recent dates. Furthermore, the data object itself may affect the data object score. For example, and as illustrated in FIG. 6, a "P_LIEN" (a lien on the property index data object) (e.g., plot 606) is associated with different data object scores based on recency than the "N_LIEN" (a lien on the general name index data object) (e.g., plot 608).

Referring to FIG. 4, the method 400 may proceed from block 404 to block 406 where it is determined that the data object score satisfies a data object score condition. In an embodiment, at block 406, the data object management controller 305 may determine that the data object score satisfies a data object score condition. For example, the data object score may fall within a first range, a second range, a third range, or any other range of data object scores. The data object score condition may be associated with a condition-specific action.

Figure 7:
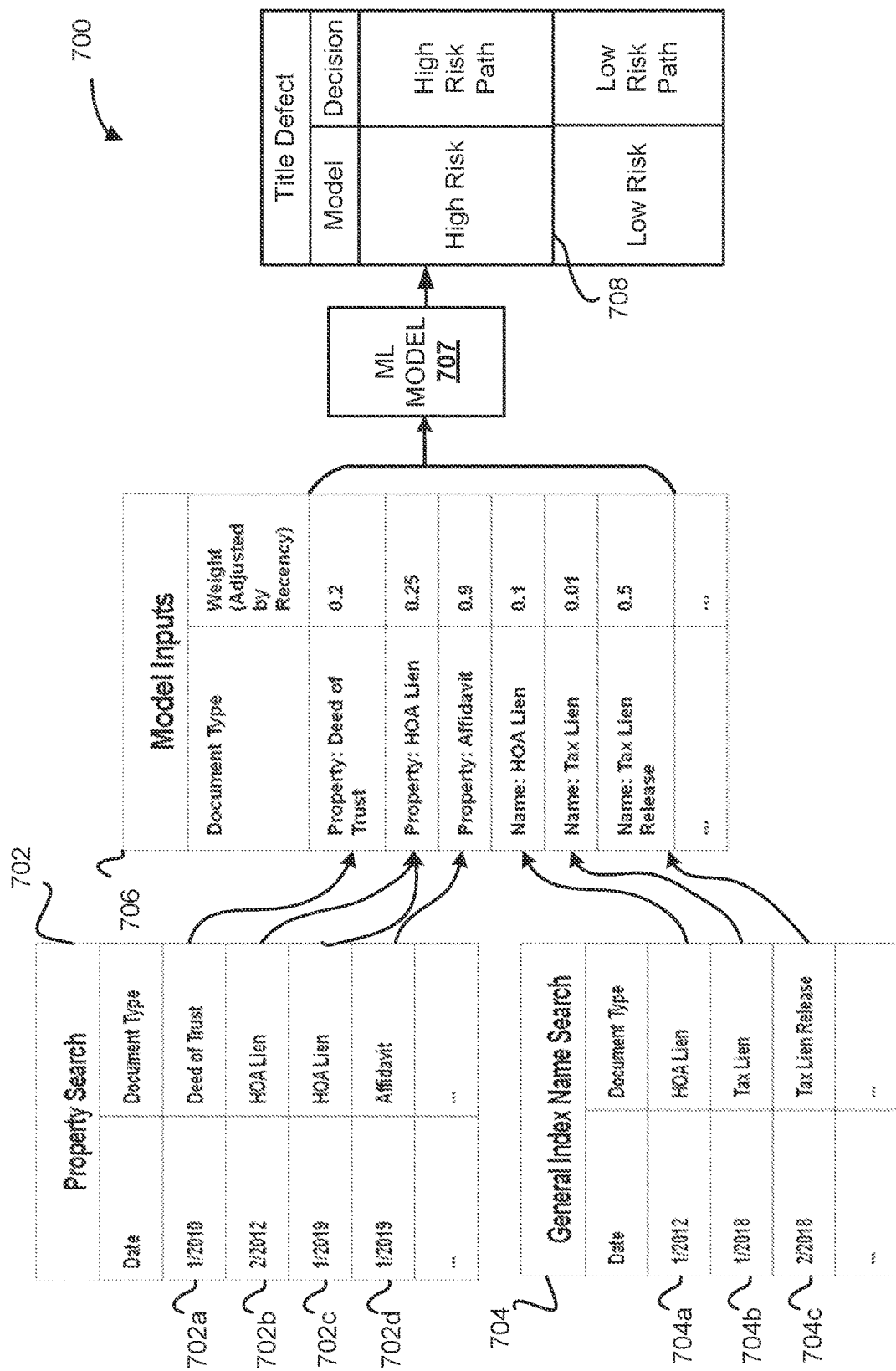
FIG. 7 is a workflow of making a predication from a data object during the method of FIG. 4, in accordance with some embodiments of the present disclosure.
Figure 8:
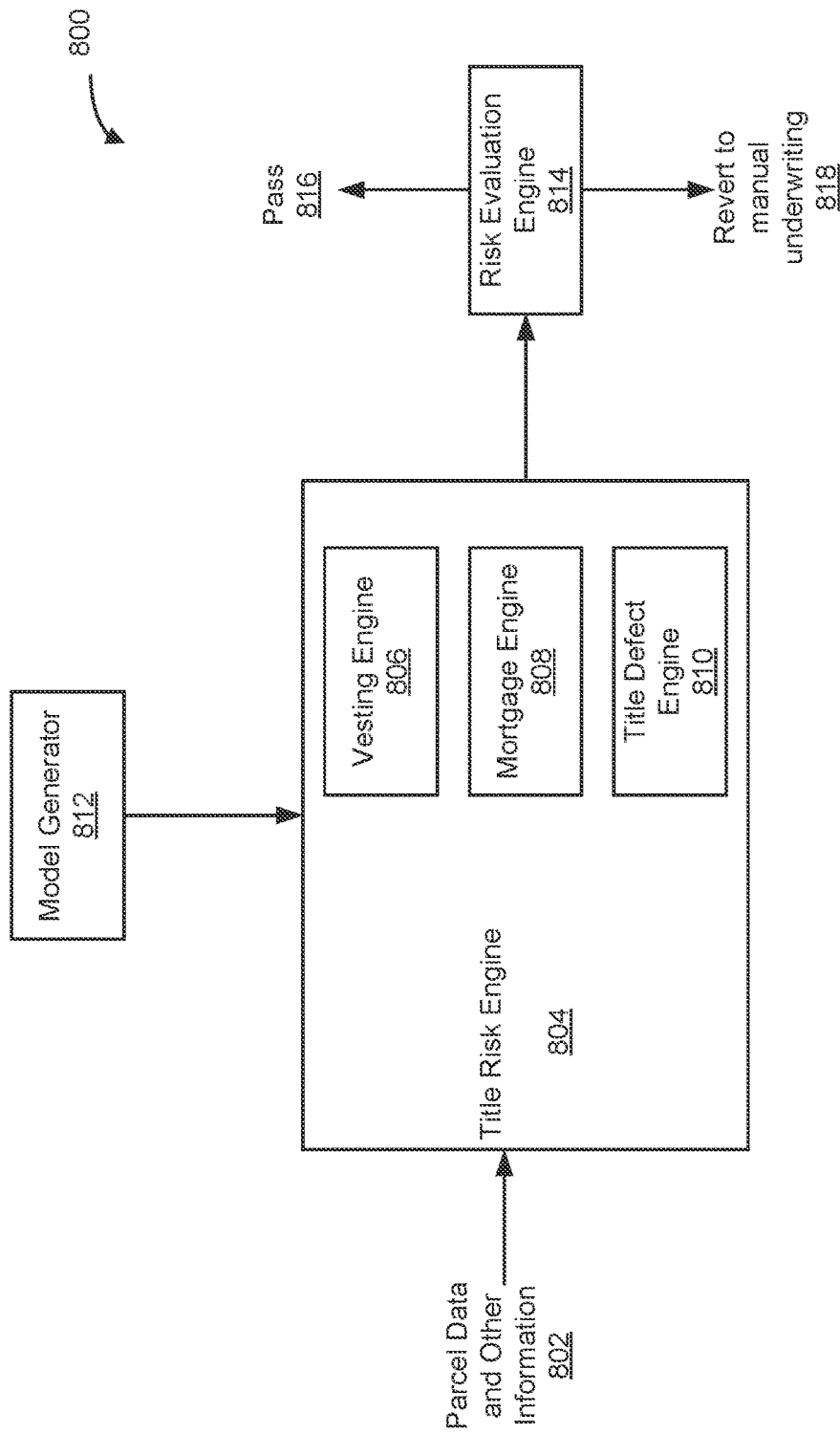
FIG. 8 is a block diagram of an example system for evaluating title risk, in accordance with some embodiments of the present disclosure.

FIG. 7 illustrates an example workflow 700 of the method 400 and the method 500. The data object management controller 305 may obtain from a title plant a property search data object 702 and a general index name search data object 704, which may be the data object 308a and 308b of FIG. 3, respectively. The property search data object 702 may have a plurality of data entries 702a-702d, and the general index name search data object 704 may have a plurality of data entries 704a-704c. The data object management controller 305 may determine data entry scores from each data entry 702a-702d and 704a-704c according to block 404 of method 400 and blocks 502-506 of method 500 and generate the model inputs table 706. As can be seen from FIG. 7, the data entries 702b and 702c may be combined together because of the same data entry text content. In some embodiments, the "0.25" data entry score may be associated with data entry 702c because it may have the greatest score, which essentially removes the data entry 702b from consideration. However, in other embodiments, the two data entry scores for data entries 702b and 702c may be averaged, added, or some other technique may be used to combine the scores. The model inputs table 706 may be provided to a machine learning model 707 included in the data object management controller 305. The machine learning model then appropriately accounts for factors in the vectorized representation such as recency, data entry type, and data entry source, based on the training performed by the "Model Generator" in block 812 of FIG. 8 discussed a below or a model generator included in the data object management controller 305. The machine learning model is then produces a single a global data object score for the data object. The data object management controller 305 or the machine learning model 707 itself may then determine whether the data object score satisfies a data object score condition 708, which may include being greater than or equal to some value or less than that value. In the illustrated example, the data object score may fall in the high-risk category.

The method 400 may then proceed to block 408 where a condition-specific action associated with the data object score condition is performed. In an embodiment, at block 408, the data object management controller 305 may run instructions that are associated with the data object score condition that the data object score satisfies. For example, the condition-specific action associated with the data object score condition may include storing the data object in a database. In another example, the condition-specific action associated with the data object score condition may include generating a non-risk notification and providing that non-risk notification to an administrator or user via the user computing device 102/200. In yet another example, the condition-specific action associated with the data object score condition may include generating a risk notification and providing that risk notification (e.g., risk of a heart attack, risk of involuntary lien, risk of a computer component failure) to an administrator or user via the user computing device 102/200. In yet other examples, the condition-specific action associated with the data object score condition includes generating an error notification or a non-error notification and providing that error notification or the non-error notification to an administrator or user via the user computing device 102/200. Continuing with the example in FIG. 7, the action associated with the data objects 702 and 704 having a data object score that falls in the high-risk range that there is an involuntary lien on a property, the condition-specific action may include taking the "High Risk Path," which may include having a manual underwriting procedure completed by an underwriter to determine whether there are any involuntary liens on the property. If the data object score fell in the low-risk range, the condition-specific action may include taking the "Low Risk Path," which may include issuing a notification to automatically insure the parcel of property.

Referring not to the specific title plant example discussed herein, in the systems and methods of discussed above may be incorporated into the predictive machine learning models of U.S. Pat. No. 10,755,184, incorporated herein by reference in its entirety. For example, the data object application 304 or the data object management controller 305 may include a system 800 of FIG. 8 for evaluating title risk, for example, as part of generating a title insurance policy. In some implementations, the system 800 may be used to generate a rapid decision as to whether to issue a title insurance policy or whether further analysis is required.

The system 800 includes a title risk engine 804. The title risk engine 804 processes parcel data 802 input to the system 800. For example, this may describe several different details about the parcel including mortgage information indicating when mortgages were recorded against the parcels as well as when any were removed. The information may also include transactions associated with the parcels including a retail history for the property, e.g., prior dates of sale. The data 802 may also include information about the parties involved in the transaction such as the purchaser and seller information for each historical transaction involving the parcel. Furthermore, the data 802 may include a title plant such as the name search, a property search, or other data objects.

The title risk engine 804 processes the input data 802 to generate one or more risk scores that are passed to a risk evaluation engine 814. The processing of the input data may include processing by various modules designed to evaluate different kinds of title risk. These modules may include a vesting engine 806, a mortgage engine 808, or a title defect engine 810. The specific data objects of the present disclosure may be provided to the title defect engine 810 that may include the machine learning model discussed above or any of the preprocessing logic that preprocesses the data objects into vector representations based on the data entry text content and recency of those data entries that are used by the machine learning model to determine the likelihood of a title default when the data object score is a result of an analysis of a title plant. The vesting engine 806 may determine the current owner(s) of the parcel based on the input data 802. The mortgage engine 808 may use a machine learning model to determine a likelihood of open mortgages associated with the real estate parcel. The title defect engine 810 may use a machine learning model to determine a likelihood of a title defect associated with the parcel of real property based on the input data about the parcel of property, e.g., a likelihood of an existing lien against the property.

The mortgage engine 808 and the title defect engine 810 may use respective machine learning models trained by one or more model generator 812. The model generator 812 uses training data to train a model designed to generate a particular prediction based on input data, as described in greater detail below. An example machine learning model for determining a likelihood of a title defect may be found in U.S. Pat. No. 10,255,550, which is incorporated here by reference in its entirety.

The risk evaluation engine 814 may receive one or more scores from the title risk engine 804. Each score may indicate a likelihood of a particular parameter evaluated by the one or more engines. For example, a respective score may be provided for each identified open mortgage indicating a likelihood determined by the mortgage engine 808 that the mortgage is still open. In another example, the score from the vesting engine 806 may indicate a level of confidence in identifying the name or names of the current owners of the parcel. The score from the title defect engine 810 may indicate a level of confidence in indicating a likelihood that there is an involuntary lien or other title defect on the parcel of property.

In response to receiving the scores, the risk evaluation engine 814 may determine whether to pass 816 the title analysis indicating that a title insurance policy may be issued without further human review or whether to revert to manual underwriting 818 for at least a portion of the title analysis. The determination may be based on one or more threshold values that indicate a risk tolerance for the particular parameter. In some implementations, a combined score may be compared to an overall threshold indicating risk tolerance for all the predicted parameters. The combination may include weighting the score from a particular engine based on the impact to acceptable risk associated with each parameter.

The system inputs the title information for the list to a machine learning model to generate a likelihood that each individual lien is actually open. The input to the machine learning model includes the dates associated with the identified liens in the parcel data as well as other statistical information retrieved from the title plant and parcel data.

The machine learning model is trained on a collection of title plant data for which information on liens is known. Based on a collection of training data from other parcels of real property, the model is trained to evaluate the statistics for the parcel of interest to determine a prediction of how likely the liens on the title plant are to be actually still open on the parcel.

The data object management controller 305 receives training data from one or more data sources. The data sources may include a number of different databases including databases associated with public records locations as well as third party databases. In some implementations, a data aggregator may collect data associated with parcels of real estate. For example, in some implementations, the system is able to receive data from different local records offices for real property e.g., county records offices or property tax offices. The system may also receive data from third parties such as credit bureaus or title companies. In some implementations, the received training data includes unstructured content that that is processed to extract particular data. For example, optical character recognition may be used to identify content of a document which may be filtered based on identifying particular terms identified in the document.

The training data may be stored in a training data repository included in the storage system 308. The training data for a machine learning model often includes values for the parameter being predicted by the model. For example, in some implementations, the training data includes data values associated with a number of distinct parcels of real property. The data values for each parcel of real property may cover a variety of data including statistical data about the property itself including a title plant. The information may also include transactions associated with the parcels including a retail history for the property, e.g., prior dates of sale, as well as purchaser and seller information.

The data object management controller 305 generates a machine learning model. The machine learning model may be based off one or more existing machine learning models as a foundation and configured to use specific information as features to train the model to generate a prediction for a specified parameter. In particular, the prediction may be a calculated likelihood for the parameter such as a likelihood that an involuntary lien or other title defect is still attached to the parcel. In other embodiments, the machine learning models may be used to generate the graphs of FIG. 7 or otherwise the optimizations between a particular data object, data entries, and time associated with the data entries.

The data object management controller 305 trains the machine learning model using the training data. In some embodiments, the obtained training data is used as input to a training engine included in the data object management controller 305 that trains a machine learning model based on the data and the known parameter values. As part of the training, the training engine extracts features from the training data and assigns various weights to the features such that a prediction and magnitude for the parameter correspond to the known parameter values. In some implementations, the features correspond to the different types of data in the training data or a subset of the types of data. The training of the model may be an iterative process that adjusts features and associated weights to some specified degree of accuracy relative to the known parameter values.

In some implementations, the machine learning model is trained to generate predictions that an involuntary lien or other title defect identified for a parcel of real property is still open. This prediction is based on the training that takes the collection of training data to learn which factors (e.g., recency score, data object type, data entry type, data object source, or other factors) increase or decrease a likelihood of a title defect being present in view of the known title plant information of the training data.

Optionally, particular optimization processes may be performed including a Markov chain optimization process. This optimization further adjusts particular parameter values in order to generate model predications that minimize the error between the predication and real-world outcomes. In another example, the optimization process may include a Bayesian optimization process. This hyperparameter tuning method often used in an optimization problem where the objective function of optimization is unknown or a black-box function where a gradient based approach cannot be applied. Bayesian optimization combines prior information about the unknown function with sample information, to obtain posterior information of the function distribution by using the Bayesian formula. From the posterior information, a deduction may be made as to where the function obtains an optimal value.

The model generator 812 that may be provided in the data object management controller 305 tests the model accuracy. For example, the model may be tested against known parameter values for parcels that were not part of the training data to see if the model agrees with the known values. For a model trained to determine a likelihood of involuntary liens, additional parcels with known involuntary lien histories may be input to the model to ensure that the model generates likelihoods that agree with the known histories. This evaluation may be performed, for example, to guard against a model that is overfit to the training data but leads to erroneous results on other data that is different than the training data. If deficiencies in the model are discovered, the model may be retrained, e.g., using additional training data that is more diverse.

The trained model may be stored as an output model or transmitted to another system, for example, to a title risk engine 804 to be used as a particular module, e.g., title defect engine 810.

Machine learning models may be very complex. The mathematics underlying the model may include one or more parameters that may be adjusted. Different combinations of parameters may result in different model performance. Ideally, the values of the model parameters are specified to minimize the difference between the model prediction and the actual results. For example, to minimize the instances where an involuntary lien is predicted with high confidence to be open, when in reality it is not, or vice versa. Minimizing this error may provide a higher confidence in the model results. The higher confidence may be reflected in the selection of the threshold used to determine whether to trust the model results or to evaluate a title plant manually. The fewer title orders that need manual review, the more title insurance decisions may be generated automatically.

Although it is possible to try every combination of parameter values to determine the set of parameters that minimize the error, this brute force technique may be very time consuming and computationally intense, in particular when there are multiple parameters leading to a very large number of possible combinations of parameter values.

Another challenge in minimizing the error is based on the nature of the mathematical functions being evaluated by the model. In the case of non-differentiable functions, it is more difficult to determine if a global minimum has been reached or just a local minimum.

One technique for working with non-differentiable functions to find the minimum error, without trying every possible combination, is to use a Markov chain approach in which parameter values are tested relative to the immediately prior values in an iterative fashion that seeks to find the point at which the error cannot be reduced further.

Figure 9:
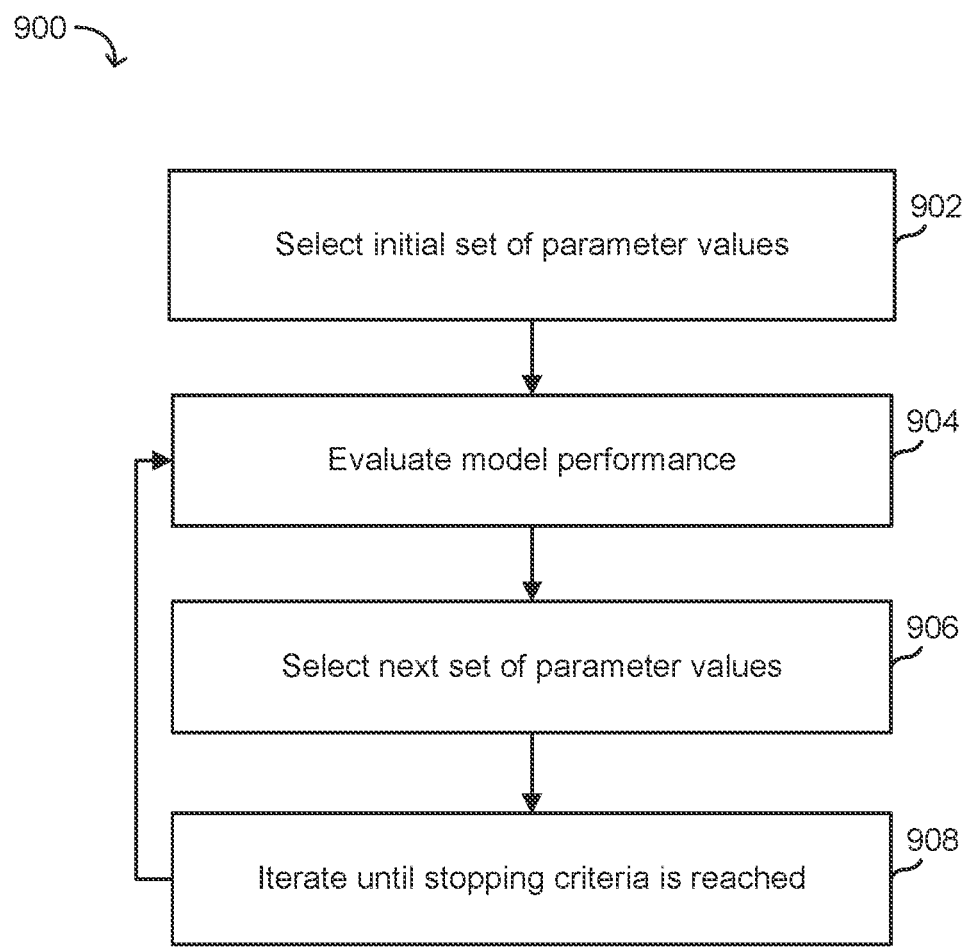
FIG. 9 is a flow diagram of an example optimization technique for a machine learning model, in accordance with some embodiments of the present disclosure.

FIG. 9 is a flow diagram of an example optimization process 900 for a machine learning model. For convenience, the process 900 will be described as being performed by a system of one or more computers, located in one or more locations, and programmed appropriately in accordance with this specification. For example, model generator 812 of system 800 of FIG. 8, appropriately programmed, may perform at least part of the process 900.

The system selects an initial set of parameter values for the model at block 902. These model parameters define the underlying mathematics of the model. In some implementations, the initial set of parameter values are taken as those from the initial training the model. In some alternative implementations, the initial set of parameter values are selected at random.

The system evaluates the model based on the initial set of parameter values at block 904. For example, the model may be evaluated based on how closely the model outputs agree with the training data or other known parameter values.

The system selects a next set of parameter values as a set of random incremental changes from the prior set of parameter values, e.g., a small hop from the initial set of parameter values at block 906

The system evaluates the model based on the next set of parameter values at block 904. In particular, the system determines whether the results of the model are better or worse than the prior evaluation of the parameter values. If there is an improvement in the model performance, a next iteration of parameter values is selected based off of the current parameter values. However, if the model performs worse, the system may either reset the parameter values to the prior set of parameter values, set or else the system may choose to keep the parameter values set to the worse-performing values. The more worse performing a value is, the less likely that the system will choose to keep it. In either case, the system then selects a next iteration of randomly selected parameter values off that set. Thus, if a hop ends up with improved performance, a next hop always occurs from that position. However, if a hop ends with worse performance, then there is a chance that the new hop may be based on the last position, in proportion to how much worse the current position is.

The system performs continued iterations of blocks 904 and 906 until some stopping criteria is reached in block 908. The stopping criteria may be based on time, number of iterations, or performance results. In some implementations, when a specified number of iterations fail to improve performance of the model, then the process is stopped and those last best performing parameter values selected for the model.

Thus, the systems and methods of the present disclosure provide predictive machine learning use time series data objects. Each data entry of the set of data entries includes text content associated with a time entry. The computer system generates a data object score using a machine learning model for the data object or multiple data objects using data entry scores for vector representations of data entries and scoring parameters that include machine learning weights. The data entry scores may be determined by vectorizing the text content of each entry. That data object score may be used to determine that data object score condition is satisfied. The computer system may then perform a condition-specific action associated with the data object score condition.

Figure 10:
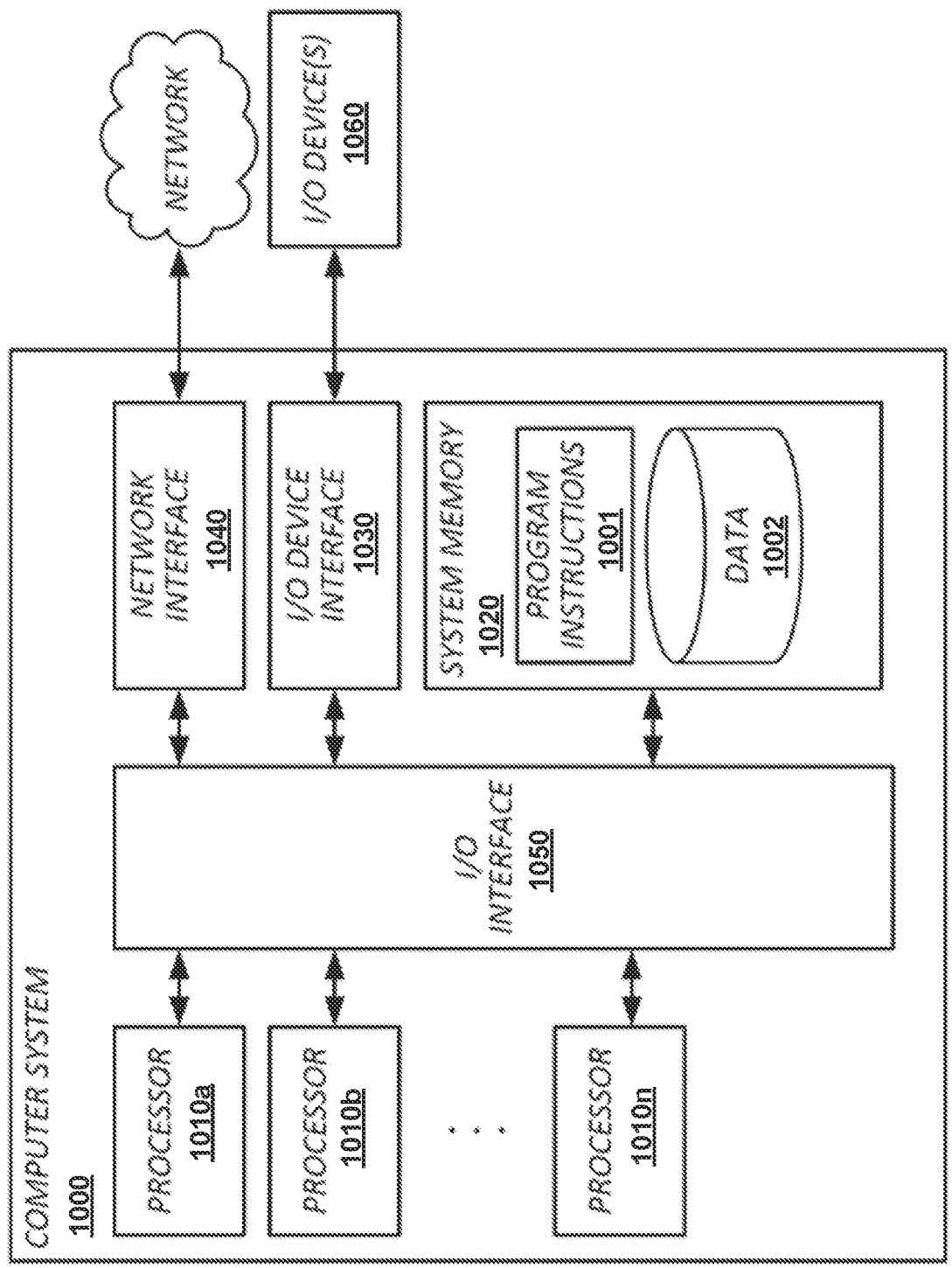
FIG. 10 is a block diagram of an example of a computing system with which the present techniques may be implemented, in accordance with some embodiments of the present disclosure.

FIG. 10 is a diagram that illustrates an exemplary computing system 1000 in accordance with embodiments of the present technique. The user computing device 102 and 200, the data object management computing devices 104 and 300, and the data object provider computing device 106, discussed above, may be provided by the computing system 1000. Various portions of systems and methods described herein, may include or be executed on one or more computing systems similar to computing system 1000. Further, processes and modules described herein may be executed by one or more processing systems similar to that of computing system 1000.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus may also be implemented as, special purpose logic circuitry, e.g., an FPGA (field programmable gate array) or an ASIC (application specific integrated circuit). Computing system 1000 may include a plurality of computing devices (e.g., distributed computing systems) to implement various processing functions.

I/O device interface 1030 may provide an interface for connection of one or more I/O devices 1060 to computing system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computing system 1000 through a wired or wireless connection. I/O devices 1060 may be connected to computing system 1000 from a remote location. I/O devices 1060 located on remote computing system, for example, may be connected to computing system 1000 via a network and network interface 1040.

Network interface 1040 may include a network adapter that provides for connection of computing system 1000 to a network. Network interface 1040 may facilitate data exchange between computing system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1001 or data 1002. Program instructions 1001 may be executable by a processor (e.g., one or more of processors 1010a-1010n) to implement one or more embodiments of the present techniques. Instructions 1001 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM or DVD-ROM, hard-drives), or the like. System memory 1020 may include a non-transitory computer readable storage medium that may have program instructions stored thereon that are executable by a computer processor (e.g., one or more of processors 1010a-610n) to cause the subject matter and the functional operations described herein. A memory (e.g., system memory 1020) may include a single memory device or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1000 or multiple computing systems 1000 configured to host different portions or instances of embodiments. Multiple computing systems 1000 may provide for parallel or sequential processing/execution of one or more portions of the techniques described herein.

Those skilled in the art will appreciate that computing system 1000 is merely illustrative and is not intended to limit the scope of the techniques described herein. Computing system 1000 may include any combination of devices or software that may perform or otherwise provide for the performance of the techniques described herein. For example, computing system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computing system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1000 may be transmitted to computing system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computing system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computing system" performing step A and "the computing system" performing step B can include the same computing device within the computing system performing both steps or different computing devices within the computing system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A non-transitory, machine-readable medium storing instructions that, when executed by one or more processors, effectuate operations comprising: obtaining, by a computer system, a first data object including a first set of data entries, wherein each data entry of the first set of data entries includes text content associated with a time entry; generating, by the computer system, a first data object score using the text content and the time entries included in the first set of data entries and using scoring parameters; determining, by the computer system, that the first data object score satisfies a data object score condition; and performing, in response to the first data object score satisfying the data object score condition, a condition-specific action associated with the data object score condition.

2. The medium of embodiment 1, wherein the generating the first data object score includes: converting the text content of each data entry to text strings; selecting text strings for each data entry that satisfy a frequency condition; vectorizing the selected text strings for each data entry to generate a data entry vector representation for each data entry; determining a recency weight for each data entry based on the time entry and the data entry vector representation; and determining a data entry score for each data entry based on the recency weight, wherein the generating the first data object score is based on an aggregation of the data entry score for each data entry.

3. The medium of embodiment 2, wherein the data entry score is determined from the recency weight and a vector-based weight.

4. The medium of embodiment 2, wherein the generating the first data object score includes: aggregating any duplicate data entry vector representation by removing the data entry vector representation that is associated with the least data entry score.

5. The medium of embodiment 2, wherein the recency weight is determined by applying an exponential decay function to a delta of the time entry and a time associated with the first data object.

6. The medium of embodiment 5, wherein a constant of the exponential decay function is determined by a machine learning algorithm.

7. The medium of embodiment 2, wherein the selecting text strings that satisfy the frequency condition includes at least one of omitting the text strings that satisfy a high frequency condition, omitting the text strings that satisfy a low frequency condition, omitting the text strings that are on a stop word dictionary.

8. The medium of embodiment 1, wherein the condition-specific action associated with the data object score condition includes storing the first data object in a database.

9. The medium of embodiment 1, wherein the condition-specific action associated with the data object score condition includes generating a non-risk notification.

10. The medium of embodiment 1, wherein the condition-specific action associated with the data object score condition includes generating a risk notification.

11. The medium of embodiment 1, wherein the condition-specific action associated with the data object score condition includes generating an error notification.

12. The medium of embodiment 1, wherein the condition-specific action associated with the data object score condition includes generating a non-error notification.

13. The medium of embodiment 1, wherein the condition-specific action associated with the data object score condition includes inputting the data object score into an ensemble-based machine learning model, wherein the operations further comprise: operating, by the computer system, the ensemble-based machine learning model with the data object score; and outputting, by the computer system, a risk score.

14. The medium of embodiment 1, wherein the first data object includes a title plant and each data entry of the first set of data entries includes a document label for a title document.

15. The medium of embodiment 1, wherein the first data object includes an error log for a hardware component or a software component included in a computing device and each data entry of the first set of data entries includes an error label for an error instance.

16. The medium of embodiment 1, wherein the operations further comprise: obtaining, by the computer system, a second data object including a second set of data entries, wherein each data entry of the second set of data entries includes text content associated with a time entry; and generating, by the computer system, a second data object score using the text content and the time entries included in the second set of data entries and using scoring parameters, wherein the first data object score includes the second data object score when determining the first object score satisfies the data object score condition.

17. The medium of embodiment 16, wherein the generating the first data object score includes: converting the text content of each data entry of the first data object to text strings; converting the text content of each data entry of the second data object to text strings; selecting text strings for each data entry of the first data object and the second data object that satisfy a frequency condition; vectorizing the selected text strings for each data entry to generate a data entry vector representation for each data entry of the first data object and the second data object; determining a recency weight for each data entry based on the time entry and the data entry vector representation; and determining a data entry score for each data entry of the first data object and the second data object based on the recency weight, wherein the generating the first data object score is based on an aggregation of the data entry score for each data entry of the first data object and the second data object.

18. The medium of embodiment 17, wherein the data entry score is determined from the recency weight, a vector-based weight, and a data object weight.

19. The medium of embodiment 1, wherein the operations further comprise steps for determining the scoring parameters.

20. A method, comprising: obtaining, by a computer system, a first data object including a first set of data entries, wherein each data entry of the first set of data entries includes text content associated with a time entry; generating, by the computer system, a first data object score using the text content and the time entries included in the first set of data entries and using scoring parameters; determining, by the computer system, that the first data object score satisfies a data object score condition; and performing, in response to the first data object score satisfying the data object score condition, a condition-specific action associated with the data object score condition.

21. A system, comprising: one or more processors; and memory storing instructions that when executed by the processors cause the processors to effectuate operations comprising: obtaining a first data object including a first set of data entries, wherein each data entry of the first set of data entries includes text content associated with a time entry; generating, using an ensemble-based machine learning model, a first data object score using the text content and the time entries included in the first set of data entries and using scoring parameters; determining that the data object score satisfies a data object score condition; and performing a condition-specific action associated with the data object score condition.

What is claimed is:

1. Recites a system, comprising:
   one or more processors; and
   memory storing instructions that when executed by the one or more processors cause the one or more processors to effectuate operations comprising:
   obtaining a first data object including a first set of data entries, wherein each data entry of the first set of data entries includes text content associated with a time entry;
   generating, using an ensemble-based machine learning model, a first data object score using the text content and the time entries included in the first set of data entries and using scoring parameters, wherein the generating the first data object score includes:
   converting the text content of each data entry to text strings;
   selecting text strings for each data entry that satisfy a frequency condition;
   vectorizing the selected text strings for each data entry to generate a data entry vector representation for each data entry;
   determining, using the ensemble-based machine learning model, a recency weight for each data entry based on the time entry and the data entry vector representation, wherein the ensemble-based machine learning model is used to determine the recency weight based on a relationship between the time entry and the data entry vector representation; and
   determining a recency weighted data entry vector for each data entry based on the recency weight, wherein the generating the first data object score is based on an aggregation of the recency weighted data entry vector for each data entry;
   determining that the first data object score satisfies a data object score condition; and
   storing the first data object in a database in response to determining that the first data object score satisfied the data object score condition.

2. A non-transitory, machine-readable medium storing instructions that, when executed by one or more processors, effectuate operations comprising:
   obtaining, by a computer system, a first data object including a first set of data entries, wherein each data entry of the first set of data entries includes text content associated with a time entry;
   generating, by the computer system using an ensemble-based machine learning model, a first data object score using the text content and the time entries included in the first set of data entries and using scoring parameters, wherein the generating the first data object score includes:
   converting the text content of each data entry to text strings;
   selecting text strings for each data entry that satisfy a frequency condition;
   vectorizing the selected text strings for each data entry to generate a data entry vector representation for each data entry;
   determining, using the ensemble-based machine learning model, a recency weight for each data entry based on the time entry and the data entry vector representation, wherein the ensemble-based machine learning model is used to determine the recency weight based on a relationship between the time entry and the data entry vector representation; and
   determining a recency weighted data entry vector for each data entry based on the recency weight, wherein the generating the first data object score is based on an aggregation of the recency weighted data entry vector for each data entry;
   determining that the first data object score satisfies a data object score condition; and
   storing the first data object in a database in response to determining that the first data object score satisfied the data object score condition.

3. The medium of claim 2, wherein the recency weighted data entry vector is determined from the recency weight and a vector-based weight.

4. The medium of claim 2, wherein the generating the first data object score includes:
   aggregating any duplicate data entry vector representation by removing the data entry vector representation that is associated with a least recency weighted data entry vector.

5. The medium of claim 2, wherein the recency weight is determined by applying an exponential decay function to a delta of the time entry and a time associated with the first data object.

6. The medium of claim 5, wherein a constant of the exponential decay function is determined by a machine learning algorithm.

7. The medium of claim 2, wherein the selecting text strings that satisfy the frequency condition includes at least one of omitting the text strings that satisfy a high frequency condition, omitting the text strings that satisfy a low frequency condition, omitting the text strings that are on a stop word dictionary.

8. The medium of claim 2, further comprising generating a non-risk notification in response to determining that the first data object score satisfies the data object score condition.

9. The medium of claim 2, further comprising generating a risk notification in response to determining that the first data object score satisfies the data object score condition.

10. The medium of claim 2, further comprising generating an error notification in response to determining that the first data object score satisfies the data object score condition.

11. The medium of claim 2, further comprising generating a non-error notification in response to determining that the first data object score satisfies the data object score condition.

12. The medium of claim 2, further comprising inputting the first data object score into the ensemble-based machine learning model
    operating, by the computer system, the ensemble-based machine learning model with the first data object score; and
    outputting, by the computer system, a risk score.

13. The medium of claim 2, wherein the first data object includes a title plant and each data entry of the first set of data entries includes a document label for a title document.

14. The medium of claim 2, wherein the first data object includes an error log for a hardware component or a software component included in a computing device and each data entry of the first set of data entries includes an error label for an error instance.

15. The medium of claim 2, wherein the operations further comprise:
    obtaining, by the computer system, a second data object including a second set of data entries, wherein each data entry of the second set of data entries includes text content associated with a time entry; and
    generating, by the computer system, a second data object score using the text content and the time entries included in the second set of data entries and using scoring parameters, wherein the first data object score includes the second data object score when determining the first object score satisfies the data object score condition.

16. The medium of claim 15, wherein the generating the first data object score includes:
    converting the text content of each data entry of the second data object to text strings;
    selecting text strings for each data entry of the second data object that satisfy the frequency condition;
    vectorizing the selected text strings for each data entry to generate a data entry vector representation for each data entry of the second data object;
    determining a recency weight for each data entry of the second data object based on the time entry and the data entry vector representation for each data entry of the second data object; and
    determining a recency weighted data entry vector for each data entry of the second data object based on the recency weight for each data entry of the second data object, wherein the generating the first data object score is based on an aggregation of the recency weighted data entry vector for each data entry of the first data object and the second data object.

17. The medium of claim 16, wherein the recency weighted data entry vector is determined from the recency weight, a vector-based weight, and a data object weight.

18. The medium of claim 2, wherein the recency weight for each data entry is based on a time delta between the time entry for that data entry and a time associated with the first data object.

19. A method, comprising:
    obtaining, by a computer system, a first data object including a first set of data entries, wherein each data entry of the first set of data entries includes text content associated with a time entry;
    generating, by the computer system using an ensemble-based machine learning model, a first data object score using the text content and the time entries included in the first set of data entries and using scoring parameters, wherein the generating the first data object score includes:
    converting the text content of each data entry to text strings;
    selecting text strings for each data entry that satisfy a frequency condition;
    vectorizing the selected text strings for each data entry to generate a data entry vector representation for each data entry;
    determining, using the ensemble-based machine learning model, a recency weight for each data entry based on the time entry and the data entry vector representation, wherein the ensemble-based machine learning model is used to determine the recency weight based on a relationship between the time entry and the data entry vector representation, and
    determining a recency weighted data entry vector for each data entry based on the recency weight, wherein the generating the first data object score is based on an aggregation of the recency weighted data entry vector for each data entry;
    determining that the first data object score satisfies a data object score condition; and
    storing the first data object in a database in response to determining that the first data object score satisfied the data object score condition.

* * * * *